United States Patent
Lampkins

(10) Patent No.: US 10,742,404 B2
(45) Date of Patent: Aug. 11, 2020

(54) SYSTEM AND ASYNCHRONOUS PROTOCOL FOR VERIFIABLE SECRET SHARING

(71) Applicant: HRL Laboratories, LLC, Malibu, CA (US)

(72) Inventor: Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/367,692

(22) Filed: Mar. 28, 2019

(65) Prior Publication Data

US 2019/0372761 A1    Dec. 5, 2019

Related U.S. Application Data

(60) Provisional application No. 62/680,931, filed on Jun. 5, 2018.

(51) Int. Cl.
*H04L 9/08*     (2006.01)
*H04L 29/08*    (2006.01)
*H04L 9/32*     (2006.01)

(52) U.S. Cl.
CPC ............ *H04L 9/085* (2013.01); *H04L 9/3236* (2013.01); *H04L 67/12* (2013.01)

(58) Field of Classification Search
CPC ....... H04L 67/12; H04L 9/085; H04L 9/3236; H04L 2209/84
USPC ........................................................ 380/278
See application file for complete search history.

(56) References Cited

U.S. PATENT DOCUMENTS

| | | | | |
|---|---|---|---|---|
| 5,625,692 | A * | 4/1997 | Herzberg | H04L 9/085 380/286 |
| 6,055,508 | A * | 4/2000 | Naor | G06Q 10/0639 705/7.38 |
| 9,152,716 | B1 * | 10/2015 | Triandopoulos | G06F 16/9535 |
| 9,614,676 | B1 * | 4/2017 | El Defrawy | H04L 9/3218 |
| 2010/0217986 | A1 * | 8/2010 | Schneider | H04L 9/085 713/171 |
| 2014/0164768 | A1 * | 6/2014 | Kruglick | H04L 63/062 713/168 |

OTHER PUBLICATIONS

Notification of Transmittal of International Search Report and the Written Opinion of the International Searching Authority for PCT/US2019/024575; dated Aug. 6, 2019.

International Search Report of the International Searching Authority for PCT/US2019/024575; dated Aug. 6, 2019.

(Continued)

*Primary Examiner* — Samson B Lemma
(74) *Attorney, Agent, or Firm* — Tope-McKay & Associates

(57) ABSTRACT

Described is a system for verifiable secret sharing amongst a plurality of servers, including a dealer server and one or more recipient servers. In operation, the dealer server encrypts a secret s using a polynomial and a hash tree with points on the polynomial as leaves. The dealer broadcasts to recipient servers hash tree data, root of the hash tree, and shares of the secret. Through an evaluation process the recipient servers are verified such that upon verification, the recipient servers reconstruct the secret s.

24 Claims, 4 Drawing Sheets

(56) References Cited

OTHER PUBLICATIONS

Written Opinion of the International Searching Authority for PCT/US2019/024575; dated Aug. 6, 2019.
Ashish Choudhury, Martin Hirt, and Arpita Patra. "Unconditionally secure asynchronous multiparty computation with linear communication complexity." Cryptology ePrint Archive, Report 2012/517, pp. 1-35, 2012.
Arpita Patra, Ashish Choudhary, and C. Pandu Rangan. "Efficient asynchronous verifiable secret sharing and multiparty computation." Cryptology ePrint Archive, Report 2010/007, pp. 1-54, 2010.
Gabriel Bracha. 1984. An asynchronous [(n − 1)/3]-resilient consensus protocol. In Proceedings of the third annual ACM symposium on Principles of distributed computing (PODC '84). ACM, New York, NY, USA, pp. 154-162. DOI: http://dx.doi.org/10.1145/800222.806743.
Fips Pub 180-4, Federal Information Processing Standards Publication, Secure Hash Standard (SHS), found at https://nvlpubs.nist.gov/nistpubs/FIPS/NIST.FIPS.180-4.pdf, pp. 1-36, Aug. 2015.

\* cited by examiner

US 10,742,404 B2

SYSTEM AND ASYNCHRONOUS PROTOCOL FOR VERIFIABLE SECRET SHARING

CROSS-REFERENCE TO RELATED APPLICATIONS

This application claims the benefit of and is a non-provisional patent application of U.S. 62/680,931, filed on Jun. 5, 2018, the entirety of which is hereby incorporated by reference.

GOVERNMENT RIGHTS

This invention was made with government support under U.S. Government Contract Number HSHQDC-13-C-B0026. The government has certain rights in the invention.

BACKGROUND OF INVENTION

(1) Field of Invention

The present invention relates to a security protocol and, more specifically, to a system and asynchronous protocol for verifiable secret sharing amongst servers.

(2) Description of Related Art

Secret sharing is a cryptographic method by which information (e.g., data) can be securely and robustly stored among a distributed group of entities. The information (known as a secret) is stored in such a way that no individual entity can reconstruct or can discover the secret from its portion of the secret (known as a share). A secret sharing protocol is a series of steps that enables a server (or entity), known as a dealer, to distribute shares of a secret or secrets among a group of servers.

A few techniques have been created in an attempt to require secret sharing amongst servers in order to verify access and reduce breaches. The protocols of Choudhury et al. and Patra et al. are directed to checking the consistency of share distributions by having the servers send received shares to each other to verify that the shares were consistent (see the List of Incorporated Literature References, Literature Reference Nos. 1 and 2). A problem with this technique is that the number of broadcasts is incredibly large, resulting in a high computational cost.

Thus, a continuing need exists for a protocol that efficiently checks for consistency of share distributions by reducing the amount of data broadcast.

SUMMARY OF INVENTION

This disclosure provides a system for verifiable secret sharing amongst a plurality of servers. The system includes a plurality of servers, including a dealer server and one or more recipient servers. Each server has one or more processors and a memory, the memory being a non-transitory computer-readable medium having executable instructions encoded thereon, such that upon execution of the instructions and initiation of an asynchronous protocol for verifiable secret sharing, the plurality of servers perform several operations, including:
constructing, by the dealer server, a bivariate polynomial that evaluates to a secret s at a given point;
constructing, by the dealer server, a hash tree with the individual points on the bivariate polynomial as leaves;
broadcasting, by the dealer server to one or more recipient servers, (1) hash tree data, (2) root of the hash tree and (3) shares of the secret;
checking, by each recipient server, that the hash tree data is correct and that the shares are leaves in the hash tree with the provided root, such that if a set of recipient servers confirm that the shares are leaves in the hash tree with the provided root, then broadcasting OK by the recipient servers;
broadcasting, by the dealer server, an identification of the set of recipient servers to the plurality of servers;
determining, by each server in the plurality of servers, if the server is a server in the broadcast set of recipient servers, such that:
if yes, then transmitting the share to servers that are not in the broadcast set of recipient servers; or
if no, then receiving shares until a threshold number of shares are received from the broadcast set of recipient servers and interpolating a univariate polynomial from the shares;
evaluating, by each server in the plurality of servers, a univariate polynomial to identify a zero coefficient, the zero coefficient being a share of secret s; and
reconstructing, by one or more servers in the plurality of servers, secret s.

In another aspect, each server is embedded within a vehicle (e.g., unmanned aerial vehicle (UAV), etc.), such that the plurality of servers collectively form a network of vehicles (e.g., UAVs, etc.).

In yet another aspect, the secret is an image taken by the vehicle or UAV or at least one of the vehicles within the network of vehicles.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer or server with associated processor(s) to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
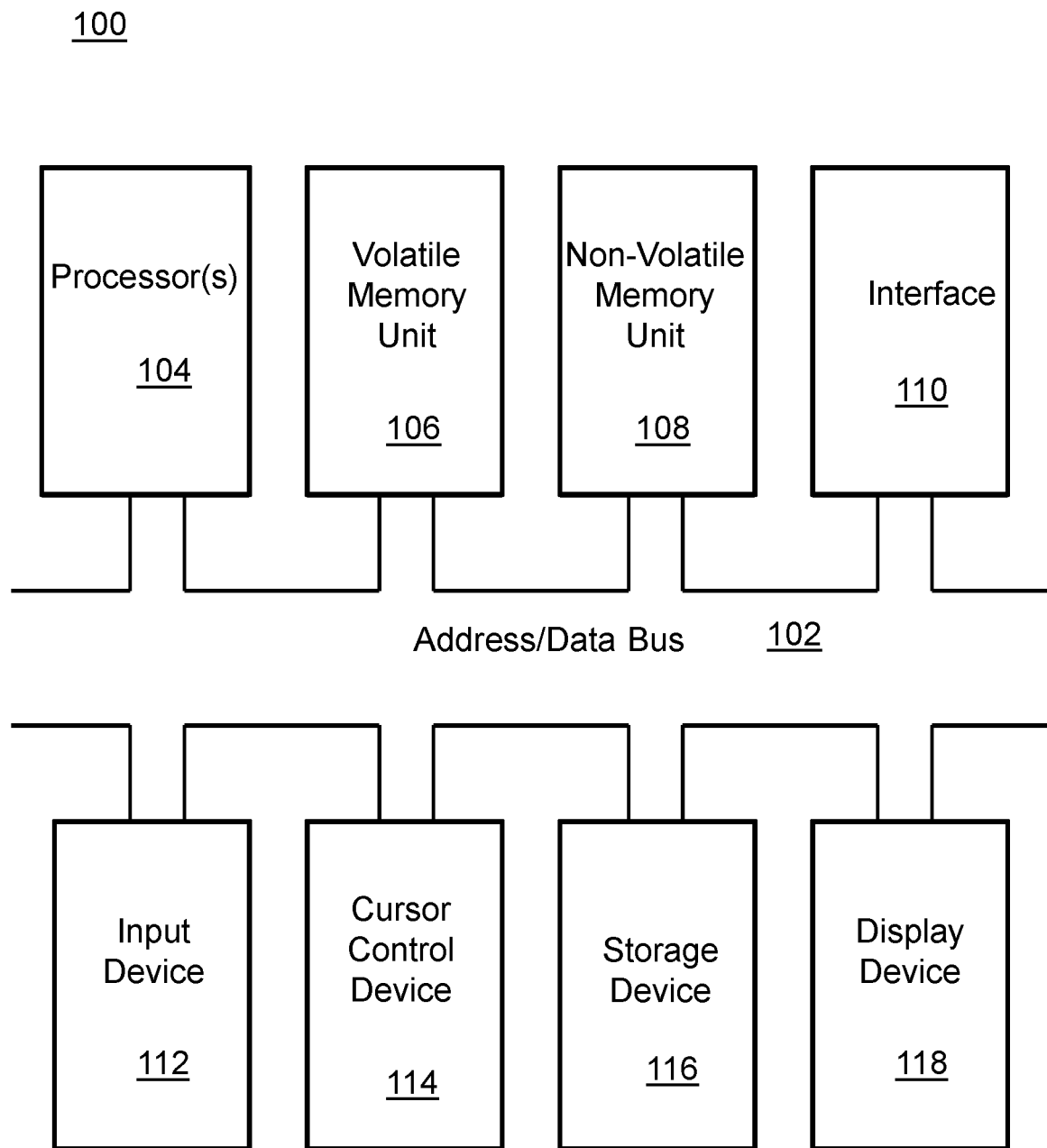
FIG. 1 is a block diagram depicting the components of a system according to various embodiments of the present invention.

The present invention relates to a security protocol and, more specifically, to a system and asynchronous protocol for verifiable secret sharing amongst servers. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Ashish Choudhury, Martin Hirt, and Arpita Patra. Unconditionally secure asynchronous multiparty computation with linear communication complexity. Cryptology ePrint Archive, Report 2012/517, 2012.
2. Arpita Patra, Ashish Choudhary, and C. Pandu Rangan. Efficient asynchronous verifiable secret sharing and multiparty computation. Cryptology ePrint Archive, Report 2010/007, 2010.
3. Gabriel Bracha. 1984. An asynchronous [(n−1)/3]-resilient consensus protocol. In Proceedings of the third annual ACM symposium on Principles of distributed computing (PODC '84). ACM, New York, N.Y., USA, 154-162. DOI: http://dx.doi.org/10.1145/800222.806743.
4. Fips Pub 180-4, Federal Information Processing Standards Publication, Secure Hash Standard (SHS), found at https://nvlpubs.nist.gov/nistpubs/FIPS/NIST.FIPS.180-4.pdf (2) Principal Aspects Various embodiments of the invention include three "principal" aspects. The first is a system with a protocol for verifiable secret sharing amongst a plurality of servers. The system is in essence a network of servers. Each of the plurality of servers operates as a computer system typically in the form of a computer operating software or in the form of a "hard-coded" instruction set. This system or computer system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

As noted above, the present invention is directed to a system that includes a plurality of servers that perform a secret sharing protocol in an asynchronous network. Each server operates as a computer system 100 to perform the operations as described herein. A block diagram depicting an example of a server operating as a computer system 100 of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
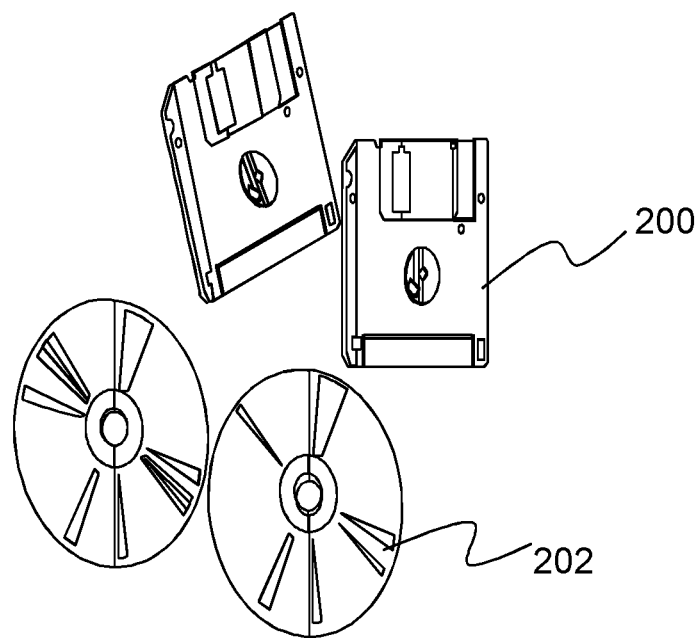
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and protocol for verifiable secret sharing of one or more secrets (e.g. data) among a collection of servers in an asynchronous network in which the servers have access to timers. The protocol uses a hash tree to verify that the distribution of shares is correct. The server that distributes the secrets (referred to as the "dealer") stores all the shares of the secret in a hash tree in which the individual shares are "leaves", and then broadcasts the root of a hash tree to all the servers ("recipients") that receive shares. The servers verify that their shares match with the hash tree, thus ensuring correctness.

The system uses a low broadcast communication bandwidth relative to other asynchronous verifiable secret sharing (AVSS) protocols. This is achieved by using the hash tree to reduce the amount of communication needed to ensure correctness and by batching broadcast messages together from multiple parallel invocations of the protocol. The AVSS protocol distributes shares of secret data among multiple servers, so that an adversary would have to compromise multiple servers in order to retrieve or destroy the data. By increasing the number of servers that an adversary would have to compromise, the data is more secure than in a traditional storage scenario, in which data is stored on a single server. Thus, through use of the low broadcast bandwidth and multiple servers, the system and protocol provide an efficient secret sharing routine that is a marked improvement over existing technologies. Further details are provided below.

(4) Specific Details of Various Embodiments

As noted above, secret sharing is a cryptographic method by which information (e.g., data) can be securely and robustly stored among a distributed group of entities. The information (known as a secret) is stored in such a way that no individual entity can reconstruct or can discover the secret from its portion of the secret (known as a share). A secret sharing protocol is a series of steps that enables a server (or entity), known as a dealer, to distribute shares of a secret or secrets among a group of servers. The protocol describes how the secret is divided up into shares and distributed among the group of servers. In addition, a secret sharing protocol normally has a threshold, and any group of servers whose size is greater than the threshold can use their shares to reconstruct the secret. Suppose, for instance, that the number of servers is 5 and the threshold is 2. Then no pair of 2 out of the 5 servers can reconstruct the secret, but any 3 out of the 5 servers can use their shares to reconstruct the secret. Thus, if an adversarial entity corrupts 2 out of the 5 servers (for instance, by installing malware), then the adversary cannot learn any secret; furthermore, the adversary cannot not destroy the information, since the other 3 servers can reconstruct the secret. Secret reconstruction can be performed using any suitable reconstruction protocol, such as the protocol OEM or BatRecPubl (see Literature Reference No. 1).

A verifiable secret sharing protocol is a secret sharing protocol that ensures that the dealer dealt valid shares of some secret or secrets. In a secret sharing protocol that does not assure verifiability, the dealer may distribute shares that are meaningless and could not be reconstructed, perhaps by simply sending random data to the other servers.

The asynchronous verifiable secret sharing (AVSS) protocol of the present disclosure improves upon the prior art by providing a verifiable secret sharing protocol that works in an asynchronous network. An asynchronous network is one in which there is no assumption that the servers in the network have a synchronized notion of time (for instance, by possessing clocks that are synchronized). The AVSS protocol distributes shares of secret data among multiple servers, so that any adversary would have to compromise multiple servers in order to retrieve or destroy the data. By increasing the number of servers that an adversary would have to compromise, the data is more secure than in a traditional storage scenario, in which the data is stored on a single server.

(4.1) Preliminaries

The protocol is described for a group of n servers, which are labeled $P_1, P_2, \ldots, P_n$. In an individual execution of the AVSS protocol, there is one server, designated the "dealer," that holds the secrets and is responsible for distributing shares of the secrets to the other servers. Then the AVSS protocol may be executed n times in parallel, so that each of the servers acts as a dealer in one of the executions, sharing a total of n secrets. The secret or secrets to be shared are elements of a finite field $\mathbb{F}$, which satisfies $|\mathbb{F}|>2n$. Let $\alpha_1, \alpha_2, \ldots, \alpha_n$ be distinct non-zero elements of $\mathbb{F}$. The value s is supposed to be kept secret, and it is indeed an element of F, but not all elements of F are secret. In particular, the values $\alpha_i$ are publicly known to all servers. The shares of the secret s are the values $F(\alpha_i, \alpha_j)$. The threshold of corruption, t, is the maximum number of servers that may be corrupted while still maintaining the security of the protocol. The protocol requires that t<n/4. So, for instance, if n=9, then t may be 2. Let [k] denote the set of integers $1, 2, \ldots, k$. Further, assume the existence of a collision-resistant hash function H whose output can be described as an element of $\mathbb{F}$. For instance, SHA-256 could serve as a suitable hash function (see Literature Reference No. 4).

The protocol assumes pairwise point-to-point communication channels between each pair of servers. The network is asynchronous, meaning that there are variable delays in message transmission, but that all messages will eventually be received. In contrast to many asynchronous protocols, the servers have access to local timers. The existence of timers allows the servers to batch messages together, which can reduce the communication complexity further than could be achieved in an asynchronous network without timers. The protocol requires that the servers have some means of broadcasting field elements over the network such that when a server broadcasts a field element, all servers receive the same field element. This can be done using a physical broadcast channel or with an asynchronous broadcast protocol that implements broadcast over asynchronous point-to-point channels, such as the protocol described by Gabriel Bracha (see Literature Reference No. 3).

(4.2) Protocol Description

Figure 3:
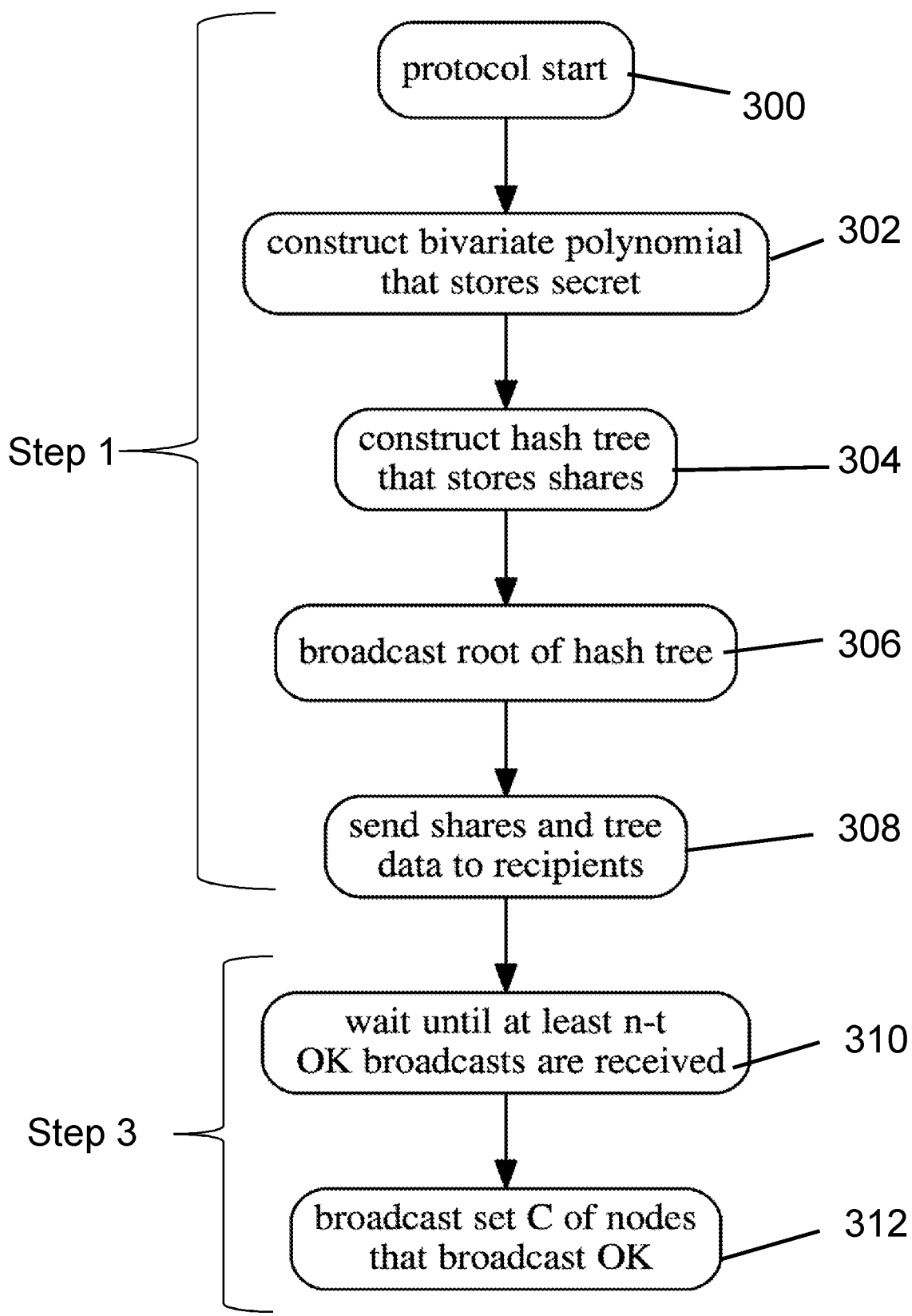
FIG. 3 is a flowchart depicting process flow for a dealer.

Provided below is an outline of the protocol steps as implemented by a plurality of servers (note that the servers are also referred to individually as nodes in a network). In Step 1 and as shown in FIG. 3, the system initiates or otherwise starts 300 the protocol. For example, a user selects a secret to share using the system, which causes the server to operate as a dealer and to initiate and proceed with the protocol to share the selected secret. Thereafter, the dealer constructs a bivariate polynomial 302 that evaluates to the secret at a given point on the polynomial using a process similar to that as described by Choudhury et al. (see Literature Reference No. 1). Next, the dealer implementing the protocol constructs a hash tree 304 with the individual points on the polynomial as leaves. The dealer sends shares to the other servers using the process as described by Choudhury et al. (see Literature Reference No. 1), but also broadcasts the root of the hash tree 306 and sends all the hash values in the hash tree 306 that are needed to confirm that the recipient's 308 shares are in the hash tree 306.

Figure 4:
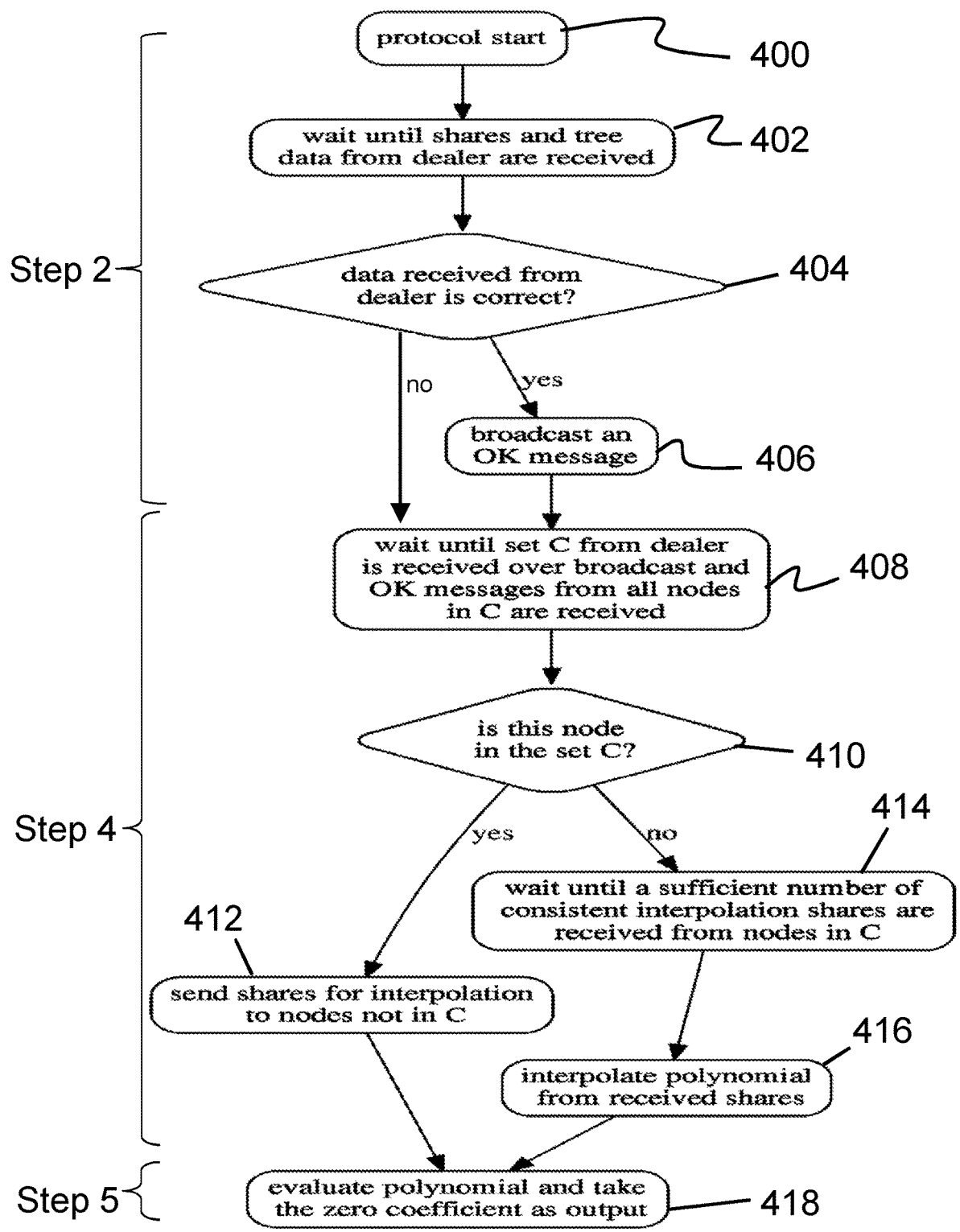
FIG. 4 is a flowchart depicting process flow for a recipient.

In Step 2 and as shown in FIG. 4, once the protocol is started 400, the recipient servers wait until share and tree data from the dealer is received 402. Upon receipt, each recipient server checks to ensure that the data received from the dealer is correct 404, by checking that the received data are consistent as in the process by Choudhury et al. (see Literature Reference No. 1) and also checking that their shares are leaves in the hash tree whose root was broadcast by the dealer. The reason they check the hash tree is that the dealer is supposed to send each point on the bivariate polynomial to two servers, and so each pair of servers need some way to confirm that they received the same shares and that the dealer did not maliciously send different information to different servers. In Choudhury et al. (see Literature Reference No. 1), this confirmation is achieved by having each pair of servers $(P_i, P_j)$ send their common shares to each other and then broadcasting a message saying OK($P_i, P_j$) to let all the other servers know that they agree. Thus, each server needs to broadcast one OK message to each other server, which leads to a high broadcast communication complexity. In the present invention, by having each server simply check if their shares correspond to the hash tree, they can broadcast a single OK message 406 to each other in Step 2 to confirm that the dealer sent shares that belong in the hash tree. This process suffices because each server received the same broadcast hash tree root, so if two servers both confirm that their shares are in the hash tree, then their shares must be identical since the hash function is assumed to be collision-resistant. This is one of the techniques by which this disclosure achieves a lower broadcast communication complexity than that of Choudhury et al.

In Steps 3 through 5, the dealer determines a set of servers that have broadcast OK messages and then broadcasts this set to all the other servers. The servers in this set then send data to the servers not in this set to allow them to reconstruct their shares. Thereafter, all servers compute their final output shares using the process of Choudhury et al. (see Literature Reference No. 1). Steps 1-5 are described in further detail in the following stepwise protocol:

1. The dealer $P_D$ performs the following to store (share) a secret s among a group of n servers (note that each server in the group of n servers is denoted as a server $P_i$):
    a. Construct 302: Select a random bivariate polynomial F(x, y) of degree 2t in x and t in y over $\mathbb{F}$ such that F(0,0)=s. Define $f_i(x)=F(x, \alpha_i)$ and $g_i(y)=F(\alpha_i, y)$ for i $\in$ [n].
    b. Construct 304: Construct a hash tree with the values $F(\alpha_i, \alpha_j)$ for i, j $\in$ [n] as leaves. The hash tree is binary, with the exception that the root has n children. More specifically:
        i. Define L=$\lceil\log_2(n-1)\rceil$. Let $r_{k,\,l}$ denote the first l bits of the L-bit binary representation of k−1 (starting with the highest order bit). Let the operator || denote concatenation.
        ii. Let $m(r_{i,L}, j)$ denote H ($F(\alpha_i, \alpha_j)$), and for each l=1, ..., L−1, let $m(r_{i,l}, j)$ denote $H(m(r_{i,l}||0, j), m(r_{i,l}||1, j))$ if there is some k $\in$ [n] such that $r_{k,l+1}=r_{i,l}||1$ and let $m(r_{i,l}, j)$ denote $H(m(r_{i,l}||0,j))$ otherwise.
        iii. Define $m(j)=H(m_{0,j}, m_{1,j})$
        iv. Define m=H(m(1), m(2), ..., m(n)).
    c. Broadcast 306: Broadcast the root m of the hash tree to all of the recipient servers $P_i$.
    d. Send Shares and Tree Data 308: For every i $\in$ [n], send the row polynomial $f_i$ and the column polynomial $g_i$ to server $P_i$. Send to each party $P_k$ the openings of all shares $F(\alpha_k, \alpha_i)$ and $F(\alpha_i, \alpha_k)$. More specifically:
        i. Send to each party m(i) for each i $\in$ [n].
        ii. Send to each $P_k$ each $m_{v,k}$ for each bit string v.
        iii. Send to each $P_k$ $m(r_{k,l}||0, j)$ and $m(r_{k,l}||1, j)$ for each l=0, ..., L−1 and each j $\in$ [n].
2. Each server $P_i$ performs the following:
    a. Check Data 404: Check that the data received from $P_D$ in Step 1 is correct. More specifically, check that:
        i. The received polynomials $f_i$ and $g_i$ are of degree 2t and t, respectively.
        ii. $f_i(\alpha_i)=g_i(\alpha_i)$
        iii. $H(g_i(\alpha_j))=m(r_{i,L}, j)$ and $H(f_i(\alpha_j))=m(r_{i,L}, j)$ for each j $\in$ [n].
        iv. All other received nodes in the hash tree (i.e., values m(•)) are hashes of the appropriate value as described in Step 1.
    b. Broadcast an OK Message 406: If every check in Step 2a passes, broadcast (OK, $P_D$). (When this protocol is executed in parallel for multiple dealers $P_D$, these broadcasts can be batched).
3. Wait 310 and Broadcast 312: Once the dealer $P_D$ receives n−t broadcasts (OK, $P_D$) 310, the dealer broadcasts 312 a set C of n−t servers that broadcasted (OK, $P_D$).
4. Wait 408: Once party $P_i$ receives a set C broadcasted by the dealer and receives a broadcast (OK, $P_D$) from each party in C, the following steps are performed:
    a. Check 410 and Send 412: If $P_i \in$ C 410, then $P_i$ sends 412 its share $f_i(\alpha a_j)=g_j(\alpha_i)$ to $P_j$ for each $P_j \notin$ C.
    b. Check 410 and Wait 414 and Interpolate 416: If $P_i \notin$ C 410, then wait 414 until d+t+1 consistent shares that define a degree d polynomial are received (where d=t), and interpolate 416 this polynomial $g_j$.

5. Evaluate 418 Each party $P_i$ takes as output $g_i(0)=f_0(\alpha_i)=F(\alpha_i, 0)$ as a share of s and terminates the secret sharing protocol.

Secrets that have been stored using the above protocol can then be reconstructed using any suitable technique known to those skilled in the art. As a non-limiting example, after each party Pi takes a share of s, the secrets can be reconstructed using the protocol OEM or BatRecPubl as described by Choudhury et al. (see Literature Reference No. 1). The protocol OEM reconstructs a single shared secret to a single server or entity. Alternatively, the protocol BatRecPubl reconstructs multiple secrets publicly, meaning that all the servers participating in BatRecPubl retrieve the secrets.

(4.3) Analysis

To measure the broadcast complexity (i.e., the amount of data broadcast), note that there are only three steps that transmit broadcasts: Steps 1c, 2b, and 3. The broadcast in Step 1c is a single field element. Since the field size is greater than $\log_2(n)$, a set of parties can be broadcast as a single field element. Thus, the broadcast in Step 3 is also a single field element, and if the protocol is executed in parallel for multiple dealers, then the OK messages in Step 2b can be grouped together into a single set of dealers for which the node is OK. Since the parties have access to timers, they can fix some time δ and only send an OK message once every δ, batching together all "OK" dealers in a single set (as a non-limiting example, δ may be 500 milliseconds). This way, the number of sets broadcast can be O(1) field elements per sender in the best case, but still O(n) field elements in the worst case. So for n executions of the AVSS protocol in parallel, there are O(n) or O($n^2$) field elements broadcast (in the best or worst case, respectively), compared to O($n^3$) in prior art, such as that of Choudhury et al. (see Literature Reference No. 1). As such, it is clear that the system and protocol of the present disclosure provides a marked technological improvement over existing security protocols and improves the functioning of the servers themselves by reducing the broadcast necessities while in operation.

(4.4) Example Implementations

The process described herein can be used for any application in which data needs to be stored with a high level of security. Some non-limiting examples of specific applications are listed below.

The system and protocol can be used to securely store data in a distributed fashion among servers. There is a wide potential range of applications, as the protocol would work equally well for the storage of any type of data. For example, the protocol could be used to store field data, such as images, gathered and collected in unmanned aerial vehicles (UAVs). The UAVs could take photographs and use the AVSS protocol in this disclosure to distribute shares of the images to the other UAVs. In this way, if no more than a threshold number of the UAVs is captured by an adversary, the images would not be revealed. If not captured, the remaining UAVs could then reconstruct the data toward some server when they have returned to a base. Reconstruction means determining the secret from some or all of the shares. To reconstruct the secret toward some designated server, the entities that hold shares would send those shares to the designated server who would then interpolate the shares to determine the polynomial and evaluate the polynomial to get the secret. Multiple servers reconstructing refers to all servers sending their shares to each other, and then they all perform the polynomial interpolation and evaluation.

As yet another example, the protocol could be used to securely store diagnostic data from vehicles among distributed servers. The invention could be used to ensure the privacy of diagnostic data, such as gas mileage, collected from vehicles. Instead of uploading mileage data to a single server, a vehicle could use the AVSS protocol to distribute shares of the mileage data to multiple servers. If no more than a threshold number of the servers are compromised by an adversary, the driver's mileage data would still remain private. When the diagnostic data needs to be used by the manufacturer or a third party, the data could be reconstructed toward the appropriate server.

As yet another example, in a cybersecurity application, the system and protocol can be used as a part of a supervisory layer to control job allocation of submissions from clients to servers that process jobs. For example, the invention could be used as a part of a system to distribute shares of a client's secret key among a group of servers. The key would then be reconstructed toward the server that is assigned the job. In this way, only the selected server would be able to see the client's secret key, and hence decrypt the client's job data. The servers are allowed to distribute data among themselves such that the integrity of the distribution is ensured against corruption of a threshold number of servers.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for verifiable secret sharing amongst a plurality of servers, the system comprising:
   a plurality of servers, including a dealer server and one or more recipient servers, each server having one or more processors and a memory, the memory being a non-transitory computer-readable medium having executable instructions encoded thereon, such that upon execution of the instructions and initiation of an asynchronous protocol for verifiable secret sharing, the plurality of servers perform operations of:
   constructing, by the dealer server, a bivariate polynomial that evaluates to a secret s at a given point;
   constructing, by the dealer server, a hash tree with the individual points on the bivariate polynomial as leaves;
   broadcasting, by the dealer server to one or more recipient servers, (1) hash tree data, (2) root of the hash tree and (3) shares of the secret;
   checking, by each recipient server, that the hash tree data is correct and that the shares are leaves in the hash tree with the provided root, such that if a set of recipient servers confirm that the shares are leaves in the hash tree with the provided root, then broadcasting OK by the recipient servers;
   broadcasting, by the dealer server, an identification of the set of recipient servers to the plurality of servers;
   determining, by each server in the plurality of servers, if the server is a server in the broadcast set of recipient servers, such that:
   if yes, then transmitting the share to servers that are not in the broadcast set of recipient servers; or
   if no, then receiving shares until a threshold number of shares are received from the broadcast set of recipient servers and interpolating a univariate polynomial from the shares;
   evaluating, by each server in the plurality of servers, a univariate polynomial to identify a zero coefficient, the zero coefficient being a share of secret s; and
   reconstructing, by one or more servers in the plurality of servers, secret s.

2. The system as set forth in claim 1, wherein each server is embedded within a vehicle, such that the plurality of servers collectively form a network of vehicles.

3. The system as set forth in claim 2, wherein the secret is an image.

4. The system as set forth in claim 3, wherein the vehicle is an unmanned aerial vehicle (UAV), such that the plurality of servers collectively form a network of UAVs.

5. The system as set forth in claim 4, wherein the secret is an image taken by at least one of the UAVs within the network of UAVs.

6. The system as set forth in claim 1, wherein the secret is an image.

7. The system as set forth in claim 1, wherein each server is embedded within an unmanned aerial vehicle (UAV), such that the plurality of servers collectively form a network of UAVs.

8. The system as set forth in claim 1, wherein the secret is an image taken by an unmanned aerial vehicle (UAV).

9. A computer program product for verifiable secret sharing amongst a plurality of servers, the computer program product comprising:
   executable instructions encoded on one or more memories associated with a plurality of servers, including a dealer server and one or more recipient servers, the one or more memories each being a non-transitory computer-readable medium having executable instructions encoded thereon, such that upon execution of the instructions and initiation of an asynchronous protocol for verifiable secret sharing, the plurality of servers perform operations of:
   constructing, by the dealer server, a bivariate polynomial that evaluates to a secret s at a given point;
   constructing, by the dealer server, a hash tree with the individual points on the bivariate polynomial as leaves;
   broadcasting, by the dealer server to one or more recipient servers, (1) hash tree data, (2) root of the hash tree and (3) shares of the secret;
   checking, by each recipient server, that the hash tree data is correct and that the shares are leaves in the hash tree with the provided root, such that if a set of recipient servers confirm that the shares are leaves in the hash tree with the provided root, then broadcasting OK by the recipient servers;
   broadcasting, by the dealer server, an identification of the set of recipient servers to the plurality of servers;
   determining, by each server in the plurality of servers, if the server is a server in the broadcast set of recipient servers, such that:

if yes, then transmitting the share to servers that are not in the broadcast set of recipient servers; or if no, then receiving shares until a threshold number of shares are received from the broadcast set of recipient servers and interpolating a univariate polynomial from the shares;

evaluating, by each server in the plurality of servers, a univariate polynomial to identify a zero coefficient, the zero coefficient being a share of secret s; and reconstructing, by one or more servers in the plurality of servers, secret s.

10. The computer program product as set forth in claim 9, wherein each memory and associated server is embedded within a vehicle, such that the plurality of servers collectively form a network of vehicles.

11. The computer program product as set forth in claim 10, wherein the secret is an image.

12. The computer program product as set forth in claim 11, wherein the vehicle is an unmanned aerial vehicle (UAV), such that the plurality of servers collectively form a network of UAVs.

13. The computer program product as set forth in claim 12, wherein the secret is an image taken by at least one of the UAVs within the network of UAVs.

14. The computer program product as set forth in claim 9, wherein the secret is an image.

15. The computer program product as set forth in claim 9, wherein each memory and associated server is embedded within an unmanned aerial vehicle (UAV), such that the plurality of servers collectively form a network of UAVs.

16. The computer program product as set forth in claim 9, wherein the secret is an image taken by an unmanned aerial vehicle (UAV).

17. A computer implemented method for verifiable secret sharing amongst a plurality of servers, the method comprising an act of:

causing a plurality of servers, including a dealer server and one or more recipient servers, to execute instructions encoded on a non-transitory computer-readable medium, such that upon execution of the instructions and initiation of an asynchronous protocol for verifiable secret sharing, the plurality of servers perform operations of:

constructing, by the dealer server, a bivariate polynomial that evaluates to a secret s at a given point;

constructing, by the dealer server, a hash tree with the individual points on the bivariate polynomial as leaves;

broadcasting, by the dealer server to one or more recipient servers, (1) hash tree data, (2) root of the hash tree and (3) shares of the secret;

checking, by each recipient server, that the hash tree data is correct and that the shares are leaves in the hash tree with the provided root, such that if a set of recipient servers confirm that the shares are leaves in the hash tree with the provided root, then broadcasting OK by the recipient servers;

broadcasting, by the dealer server, an identification of the set of recipient servers to the plurality of servers;

determining, by each server in the plurality of servers, if the server is a server in the broadcast set of recipient servers, such that:

if yes, then transmitting the share to servers that are not in the broadcast set of recipient servers; or if no, then receiving shares until a threshold number of shares are received from the broadcast set of recipient servers and interpolating a univariate polynomial from the shares;

evaluating, by each server in the plurality of servers, a univariate polynomial to identify a zero coefficient, the zero coefficient being a share of secret s; and reconstructing, by one or more servers in the plurality of servers, secret s.

18. The method as set forth in claim 17, wherein each server is embedded within a vehicle, such that the plurality of servers collectively form a network of vehicles.

19. The method as set forth in claim 18, wherein the secret is an image.

20. The method as set forth in claim 19, wherein the vehicle is an unmanned aerial vehicle (UAV), such that the plurality of servers collectively form a network of UAVs.

21. The method as set forth in claim 20, wherein the secret is an image taken by at least one of the UAVs within the network of UAVs.

22. The method as set forth in claim 17, wherein the secret is an image.

23. The method as set forth in claim 17, wherein each server is embedded within an unmanned aerial vehicle (UAV), such that the plurality of servers collectively form a network of UAVs.

24. The method as set forth in claim 17, wherein the secret is an image taken by an unmanned aerial vehicle (UAV).

* * * * *